(12) United States Patent
Moussavi

(10) Patent No.: US 9,087,317 B2
(45) Date of Patent: Jul. 21, 2015

(54) NUCLEAR POWER STATION COMPONENT WITH MARKING BY LUMINESCENT NANOPARTICLES, CORRESPONDING READING PROCESS AND ASSEMBLY

(75) Inventor: Mehdi Moussavi, Paris (FR)

(73) Assignee: AREVA, Paris (FR)

( * ) Notice: Subject to any disclaimer, the term of this patent is extended or adjusted under 35 U.S.C. 154(b) by 128 days.

(21) Appl. No.: 13/993,532

(22) PCT Filed: Dec. 9, 2011

(86) PCT No.: PCT/EP2011/072368
§ 371 (c)(1),
(2), (4) Date: Jun. 12, 2013

(87) PCT Pub. No.: WO2012/080140
PCT Pub. Date: Jun. 21, 2012

(65) Prior Publication Data
US 2013/0270340 A1    Oct. 17, 2013

(30) Foreign Application Priority Data
Dec. 13, 2010  (FR) .................................. 10 60425

(51) Int. Cl.
G06K 19/06    (2006.01)
G06Q 10/08    (2012.01)
C09K 11/02    (2006.01)

(52) U.S. Cl.
CPC .............. G06Q 10/087 (2013.01); C09K 11/02 (2013.01); C09K 11/025 (2013.01)

(58) Field of Classification Search
CPC    B41M 3/144; B42D 2035/34; B42D 2035/36
USPC .......................... 235/487, 491, 457, 468, 473
See application file for complete search history.

(56) References Cited

U.S. PATENT DOCUMENTS

| 4,131,064 | A * | 12/1978 | Ryan et al. .................... 102/293 |
| 6,576,155 | B1 * | 6/2003 | Barbera-Guillem ..... 252/301.36 |
| 7,077,329 | B2 * | 7/2006 | Chang et al. ................... 235/491 |
| 7,720,254 | B2 * | 5/2010 | Stierman et al. .............. 382/100 |
| 2002/0021003 | A1 * | 2/2002 | McGrew ......................... 283/93 |
| 2006/0033325 | A1 * | 2/2006 | Maruvada et al. .............. 283/95 |
| 2007/0119951 | A1 * | 5/2007 | Auslander et al. ............. 235/491 |
| 2010/0006637 | A1 * | 1/2010 | Stroinski et al. .............. 235/375 |

* cited by examiner

Primary Examiner — Paultep Savusdiphol
(74) Attorney, Agent, or Firm — Davidson, Davidson & Kappel, LLC

(57) ABSTRACT

A nuclear power station component is provided. The nuclear power station includes a metal structure having an external surface; at least one marking placed on the external surface and encoding information related to the component. The marking includes a plurality of luminescent nanoparticles, each provided to emit optical radiation having a certain emission wavelength when said luminescent nanoparticle is excited with optical radiation having a certain emission wavelength.

15 Claims, 3 Drawing Sheets

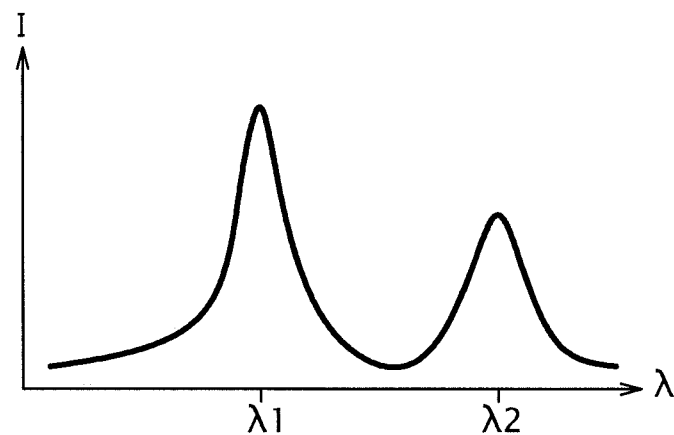
FIG.9
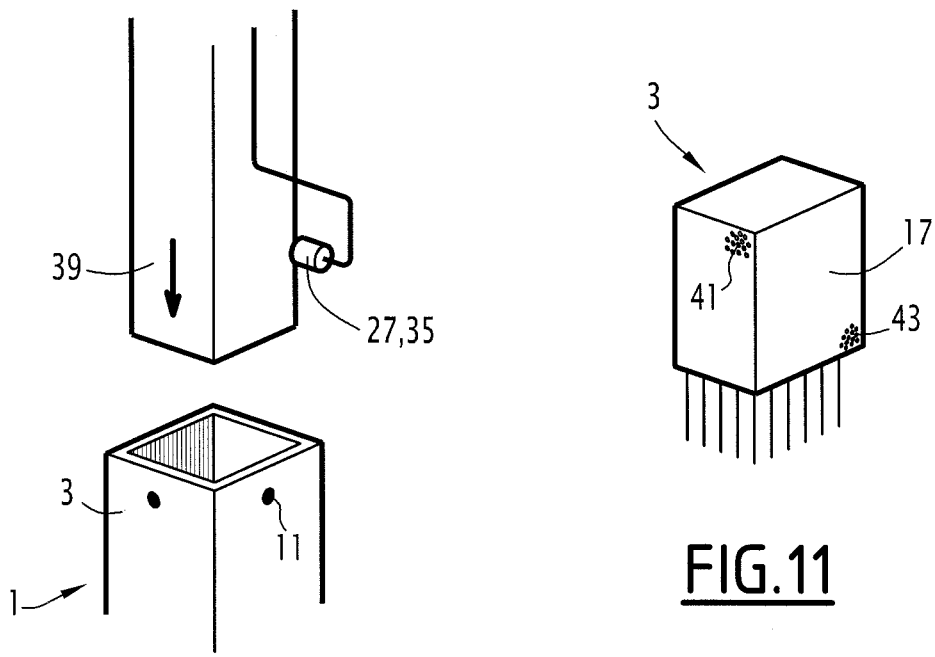
FIG.10
FIG.11

NUCLEAR POWER STATION COMPONENT WITH MARKING BY LUMINESCENT NANOPARTICLES, CORRESPONDING READING PROCESS AND ASSEMBLY

The invention generally concerns the identification and tracing of nuclear station components, in particular nuclear fuel assemblies or replacement parts.

More specifically, a first aspect of the invention concerns a nuclear station component comprising:
a metal structure having an external surface;
at least one marking placed on the external surface encoding information related to the component.

BACKGROUND

Today, nuclear fuel assemblies do not have any specific identification markers. Assemblies are tracked over the cycle essentially by the precise location of a part of its storage facility before and after charging in the core on the one hand, and, on the other hand, by their position in the reactor core in operation. Thus, a handling error may entail risks with regard to the precise tracking of an assembly over its life cycle. In particular, when recharging the core, it is necessary to ensure that the assemblies are positioned and/or replaced according to a precise position established in advance. A handling error by the operator may result in an imbalance of the core, and thus a risk of operating accidents.

Furthermore, in the context of the resurgence of nuclear power, new countries must have access to civilian nuclear power. For liability and warranty reasons, it is necessary for the manufacturers and suppliers of the nuclear power station to be able to verify and guarantee the authenticity of their components.

SUMMARY OF THE INVENTION

In this regard, a nuclear power station component is provided having a marking allowing for verification of the authenticity of the parts that can be used in the environment of a nuclear reactor, in particular under water and irradiation.

Furthermore, this marking may be customised. Associated with a standard reading device, it allows for tracking of the life cycle of the component as such rather than based on its position in the various phases of its operational and/or storage life cycle.

To this end, a nuclear power component of the aforementioned type is provided, characterised in that the marking includes a plurality of luminescent nanoparticles, each provided to emit optical radiation having a certain emission wavelength when the nanoparticle is excited with optical radiation having a certain emission wavelength.

The optical radiation spectrum emitted overall by the nanoparticles will include peaks for the emission wavelengths of the various types of nanoparticles constituting the marking. The height of each peak depends on the number of nanoparticles having the corresponding emission wavelength. If the marking includes several types of luminescent nanoparticles emitting on different emission wavelengths, the overall optical radiation will include various peaks with different heights. This spectrum is characteristic of the nuclear station component, and may be associated one-to-one with the information related to the component. For example, the identification number of the component may be associated one-to-one with a given spectrum.

This type of marking is particularly advantageous, because it is invisible to the naked eye due to the very small size of the luminescent nanoparticles. It can only be read with a suitable device. Reading requires the knowledge of the excitation wavelength to use. The information on the component can only be determined if one knows the rule according to which the spectrum collected corresponds to the information. Thus, it is extremely difficult to falsify this type of marking, such that the authenticity of the components is more easily ensured.

The marking may be read under water with high reliability. The optical radiation that excites the nanoparticles and the optical radiation emitted by the nanoparticles have wavelengths compatible with underwater propagation.

The nanoparticles of the marking are rigidly affixed to the external surface of the metal structure, and can thus be read after the fuel assemblies have been placed in the reactor core, and at all stages of the life cycle of the fuel assembly. Such a marking thus allows the nuclear fuel assembly, and more generally all components bearing such a marking, to be tracked over the entire life cycle of the assembly or component.

This type of marking can be read with relatively simple equipment (optical radiation source, camera suited to capture the optical radiation emitted), but the association of the optical radiation spectrum with the information on the component can be carried out with sophisticated software for security reasons. Thus, persons seeking to determine the information encoded by the marking based on the optical radiation emitted will have great difficulties if they do not know what software was used to create the association and are not in possession of the passwords used by the software.

The nuclear station component is typically a nuclear fuel assembly or a nuclear station component such as an element internal to the core (grid, baffle, damping element, etc.). The component may also be a piece of piping, an element of a primary pump, an element of a steam generator, or any other element of the nuclear power station.

The metal structure may consist of any metal or alloy of metals, in particular steel, copper, etc.

According to a first embodiment, the nanoparticles are arranged in a line, as with a bar code. This arrangement is simple and easily carried out. In this embodiment, the nanoparticles may be read by scanning, and the camera or optical fiber used must move. This may constitute a disadvantage if the reading device is affixed to the end of a gripping tool of the assembly that is not equipped with an additional part to allow for this movement.

In one variant, the nanoparticles are arranged according to a motif extending on a plane. Such an arrangement may allow for a broader range of spectra than the linear arrangement.

According to yet another variant, the nanoparticles are arranged in a three-dimensional pattern. This allows for an even broader range of spectra.

In this case, the nanoparticles are arranged at different points with regard to the external surface, e.g., in cavities of various depths, or on different rungs of a hollow protrusion in the form of a ladder bored into the external surface.

The information related to the component encoded by the marking is typically an identification number of the component. However, the marking may encode other information in addition to, or instead of the identification number. This information may, for example, be a code corresponding to the place of manufacture of the component, the manufacture date, or any other relevant information.

Luminescent nanoparticles are typically nanoparticles of the type described in US 2005/0095715, US 2010/0006637, FR 2918585, WO2008/132223, US 2008/0159657 or US 2009/0258200.

Advantageously, each nanoparticle has a phosphor and a shell covering the phosphor, the shell consisting of a mineral oxide such as polysiloxane SiO2, zirconium oxide ZrO2, or alumina Al2O3.

The phosphor is preferably made of a mineral material, and not an organic material. This allows for the phosphor to have better resistance to irradiation.

The phosphors typically have sizes between one nanometre and 100 nanometres, preferably 1 and 50 nanometres.

The mineral oxide shell typically has a thickness of 50-500 nm or more within the limits of its transparency to light radiation in the selected wavelength range.

The shell consists of a material transparent to infrared, visible, or ultraviolet rays. Thus, it does not obstruct the optical radiation emitted by the phosphors.

According to a first embodiment, the phosphor constitutes a core of the nanoparticle, with the shell completely covering this core. In other words, the phosphor is nested with a mineral oxide matrix having the aforementioned composition.

In this case, each nanoparticle is placed on the external surface and affixed to it by any suited means.

In another embodiment, the external surface of the metal structure comprises a hollow protrusion inside which the phosphor is positioned. The mineral oxide shell covers the phosphor and closes the hollow protrusion. In this case, the phosphor is not entirely covered by the shell. The phosphor and the shell instead constitute two layers, superimposed upon one another, filling the hollow protrusion.

In a particularly advantageous embodiment, the component includes:
  a first marking placed in a first predetermined place on the external surface, to be read with optical radiation having a first determined excitation wavelength;
  a second marking placed in a second place on the external surface, to be read with optical radiation having a second determined excitation wavelength;
  whereby the first marking encodes information related to the second place and the second excitation wavelength; and whereby the second marking encodes the information related to the component.

The first marking is of the type described above, and includes several luminescent nanoparticles. By reading the first marking, it is possible to access the information on the location of the second marking and the excitation wavelength allowing the second marking to be read. The first place, in which the first marking is placed, is, for example, the same for all nuclear fuel assemblies. On the other hand, the second place may be specific to each nuclear fuel assembly, and may vary from one nuclear fuel assembly to the next. Likewise, the excitation wavelength allowing the first marking to be read may be common to all nuclear fuel assemblies, whilst the excitation wavelength allowing the second marking to be read may be different and specific to each nuclear fuel assembly.

Thus, it is more difficult to gain access to the information encoded by the marking. This increases security.

Each marking is read in the following manner:
  illumination of the marking with an optical radiation having at least one wavelength suited to excite the luminescent nanoparticles of the marking;
  acquisition of the optical radiation emitted by the luminescent nanoparticles of the marking under the excitation effect resulting from the illumination;
  reconstitution of the information related to the nuclear station component based on the optical radiation acquired.

The optical radiation used to illuminate the marking has a single wavelength, or a plurality of wavelengths within a narrow range around the wavelength suited to excite the luminescent nanoparticles.

The optical radiation source is, for example, positioned at a distance from the component the marking of which must be read. The optical radiation is transmitted to the marking by a wave guide, typically by an optical fiber. The optical radiation is projected on the marking from one end of the optical fiber in the immediate vicinity of the marking, for example a few millimetres from the marking. This is particularly advantageous when the reading is carried out under water, as the characteristics of the optical radiation are practically unchanged before the radiation reaches the marking.

In a first embodiment, the optical radiation emitted by the nanoparticles is acquired, i.e., collected, by a camera. The camera is, for example, a 2D camera. When the component having the marking emits radiation, e.g., in the case of a nuclear fuel assembly exiting the reactor core, the camera may be placed in a protective casing that is resistant to nuclear radiation.

Alternatively, the camera may be placed at a distance from the component having the marking to be read. In this case, the optical radiation emitted by the nanoparticles is acquired by a wave guide, typically an optical fiber, one end of which is placed in the immediate vicinity of the marking. The wave guide transmits the optical radiation acquired to the camera.

The reconstitution of the information related to the nuclear station component based on the optical radiation acquired is carried out by a computer. The computer is typically programmed for this purpose. Typically, the computer will identify the number of peaks in the spectrum of optical radiation acquired, the wavelengths on which the peaks are centred, and the height of each of the peaks. Based on this information, the computer determines the information sought, using, for example, a table placed in the memory of the computer. The table associates the identification numbers of a certain number of nuclear fuel assemblies one-to-one with the characteristics of the optical radiation spectrum collected. These characteristics are essentially the wavelengths on which the peaks are centred, and the heights of the peaks.

Alternatively, the identification number or the information related to the component may be determined based on the position and height of the peaks, not with a table, but by using more complex calculation formulae.

When the component includes two markings, as described above, with a first marking encoding the placement of the second marking and the excitation wavelength suited for the second marking, the method described above is carried out twice. First the first marking is illuminated with optical radiation having a suited excitation wavelength, the optical radiation emitted by the first marking is collected, and the information sought is reconstituted based on the first optical radiation collected. Then, the second marking is illuminated with a second optical radiation having a suited excitation wavelength, the second optical radiation emitted by the second marking is collected, and the information on the component is reconstituted by calculation based on the second optical radiation collected.

When the nuclear station component is a nuclear fuel assembly, it is particularly advantageous to place the device for illuminating the marking and the device for acquiring the optical radiation emitted on a device for gripping and transporting the nuclear fuel assembly. In this case, the reading typically occurs under water, in a pool. The gripping device is typically a claw suited to be coupled with a nozzle of the nuclear fuel assembly. The marking (s) are placed on a surface of the nozzle, for example on a lateral surface of the nozzle.

BRIEF SUMMARY OF THE DRAWINGS

Other characteristics and benefits of the invention can be seen from the detailed description provided below, by way of example only, in reference to the attached drawings, of which:

FIG. 9 is a graphic representation of the optical radiation spectrum emitted by the marking in FIG. 1;

FIG. 10 is a schematic representation of an assembly provided for reading the marking of the nuclear fuel assembly mounted on a gripping tool of this assembly; and FIG. 11 is a schematic perspective view of a nuclear fuel assembly having two markings.

DETAILED DESCRIPTION

Figure 1:
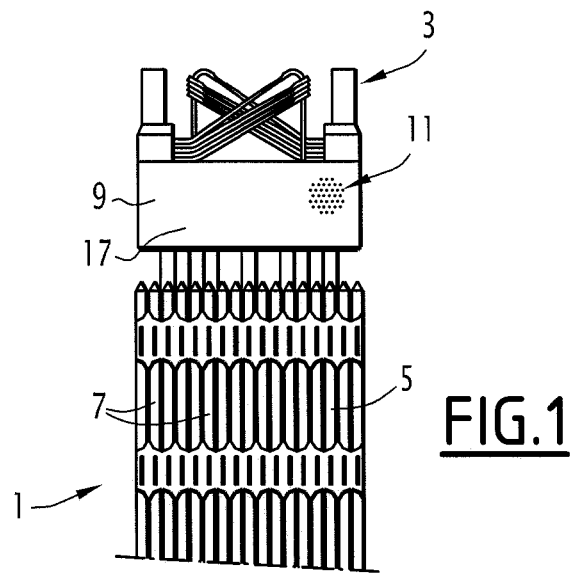
FIG. 1 is a schematic side view of the upper part of a nuclear fuel assembly according to the invention.

The nuclear fuel assembly 1 shown in FIG. 1 comprises an upper nozzle 3, a lower nozzle (not shown), a skeleton 5 connecting the two nozzles to one another, and nuclear fuel rods 7 held in place by the skeleton 5. The upper nozzle 3 has a cross section delimited by four flat lateral faces 9.

The assembly 1 has, on one of the faces 9 of the upper nozzle, a marking 11. This marking encodes the identification number of the nuclear fuel assembly.

Figure 2:
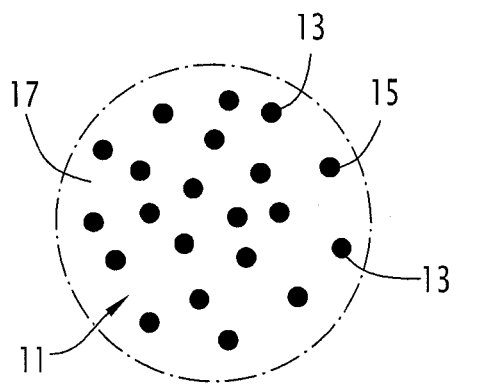
FIG. 2 is an enlarged view of the marking of the nozzle of the nuclear fuel assembly of FIG. 1.

As can be seen in FIG. 2, the marking 11 includes a plurality of luminescent nanoparticles 13, 15, affixed to the external surface 17 of the nozzle 3.

Each nanoparticle includes, or consists of, a material provided to emit an optical radiation having a determined emission wavelength when the nanoparticle is excited with an optical radiation having a determined excitation wavelength.

Figure 3:
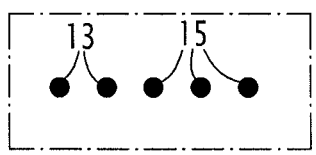
FIGS. 3-5 are schematic representation of various types of markings.
Figure 4:
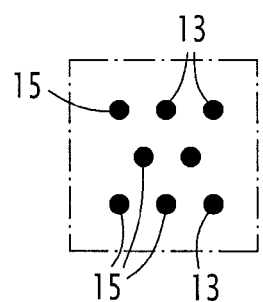

In a first embodiment shown in FIG. 3, the nanoparticles 13, 15 are arranged in a line. In the variant in FIG. 4, and as shown in FIGS. 1 and 2, the nanoparticles are arranged on a flat surface.

Figure 5:
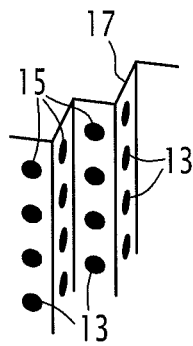

In the variant of FIG. 5, the nanoparticles are arranged in a three-dimensional pattern. They are arranged, for example, on the rungs of a hollow protrusion in the form of a ladder, bored into the surface 17.

The optical radiation emitted overall by the marking, corresponding to the sum of the optical radiation emitted by each of the nanoparticles of the marking, is affected by the pattern in which the nanoparticles are arranged. Thus, nanoparticles arranged in a three-dimensional pattern will emit, overall, an optical radiation slightly different to the same particles arranged in a two-dimensional pattern.

Each of the nanoparticles includes a phosphor 19 and a shell 21 covering the phosphor 19. The phosphor 19 is made of a mineral material, for example a coloured mineral pigment. The phosphor is a particle suited to emit infrared, visible, or ultraviolet rays by luminescence. In a variant not shown, the nanoparticle includes an additional element, associated with the phosphor 19, intended to modify the wavelength of the radiation emitted by the phosphor. The shell 21 consists of a mineral oxide, e.g., polysiloxane SiO2, zirconium oxide ZrO2, or alumina Al2O3. This material is transparent to the infrared, visible, or ultraviolet rays emitted by the phosphor. It has a thickness of 50-500 nm. Such a thickness is sufficient to protect the phosphor from irradiation and allow it to maintain its luminescence properties, after, for example, three years in the core of a nuclear reactor.

In another variant, this thickness may be intentionally reduced in order to render fragile the nanoparticles exposed to gamma radiation and neutron flux in a controlled fashion. In this variant, the reading of the light intensity emitted by the nanoparticles indicates the dose of radioactivity emitted and/or received by the nanoparticles, and may advantageously serve as a detector for wear of the component in question. For example, for the fuel assembly, this may provide information on the wear of the fuel. For detectors internal to the reactor core, this may provide additional information on the rates of wear and tear, thus improving signal correction and/or maintenance procedures for these detectors.

Figure 6:
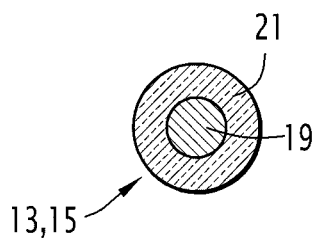
FIGS. 6-7 are schematic cutaways of the nanoparticles of the markings in FIGS. 1-5.

In the embodiment of FIG. 6, the phosphor 19 constitutes a core, with the shell completely covering the phosphor 19. The phosphor 19 is thus nested within the shell 21.

Figure 7:
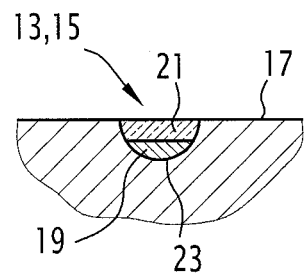

In the embodiment of FIG. 7, the external surface 17 has a hollow protrusion 23. The phosphor 19 is placed at the bottom of the hollow protrusion 23. The shell 21 is also placed within the hollow protrusion 23, and completely covers the phosphor 19. The shell 21 forms a layer superimposed upon the phosphor 19. The shell 21 completely closes the hollow protrusion 23.

Figure 8:
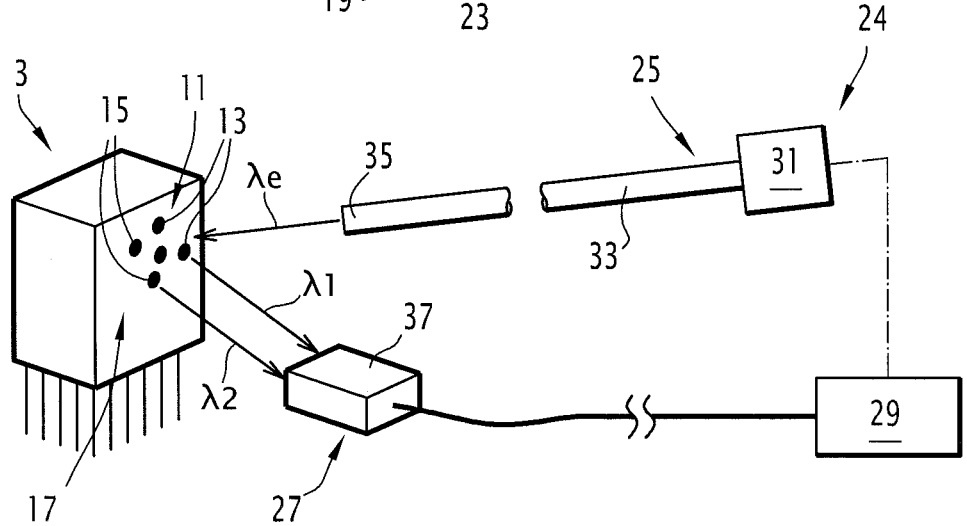
FIG. 8 is a schematic representation of an assembly suited for reading the marking of the nuclear fuel assembly of FIG. 1.

An assembly suited for reading the marking 11 of the fuel assembly shown in FIG. 1 is illustrated in FIG. 8. This assembly includes:
  a device 25 for illumination of the marking 11 with an optical radiation having at least one wavelength suited to excite the luminescent nanoparticles 13, 15 of the marking 11;
  an acquisition element 27 suited to collect the optical radiation emitted by the luminescent nanoparticles of the marking 11 under the excitation effect resulting from the illumination;
  a computer 29 programmed to reconstitute the information encoded by the marking 11 based on the optical radiation collected by the element 27.

The illumination device 25 comprises an optical radiation source 31 suited to generate radiation having the desired wavelength, and an optical fiber 33. The source 31 is, for example, a laser source. The optical fiber 33 is suited to conduct the optical radiation generated by the source 31 to a point in the vicinity of the marking 11. The optical radiation is thus projected from one end 35 of the optical fiber to the marking 11.

In the example shown in FIG. 8, the element suited to collect the optical radiation emitted by the nanoparticles of the marking 11 is a two-dimensional camera 37.

The camera 37 is connected to the computer 29, and is provided to transmit the signal collected to the computer 29.

The signal collected by the camera 37 is of the type shown in FIG. 9. This figure shows the spectrum of the optical radiation collected by the camera. The wavelength is in the form of an abscissa, and the intensity of the radiation for each wavelength is on the vertical axis. In the example shown, the marking includes two types of nanoparticles. The nanoparticles 13 of the type that emits optical radiation of the wavelength $\lambda_1$ when the nanoparticle is excited with optical radiation of the excitation wavelength $\lambda_e$. The nanoparticles 15 of the type that emits optical radiation of the wavelength $\lambda_2$ when the nanoparticle is excited with optical radiation of the excitation wavelength $\lambda_e$. The signal collected by the camera 37 thus includes two peaks, one centred on the wavelength $\lambda_1$ and the other on the wavelength $\lambda_2$. The height of the peak depends, in particular, on the number of nanoparticles 13 and the number of nanoparticles 15. In the example shown, the marking includes a greater number of nanoparticles 13 than nanoparticles 15.

Of course, the marking may include more than two types of particles, such that the signal has more than two peaks. The signal may include three, four, or more than four peaks.

The computer 29 determines the identification number of the nuclear fuel assembly 1 based on the optical radiation collected. For example, it includes a table associating the identification number with the position and height of the peaks.

The optical fiber 35 and the camera 37 are mounted on a gripping and transport tool of the nuclear fuel assembly, as illustrated in FIG. 10. The tool 39 is provided to grip the upper nozzle 3 of the nuclear fuel assembly. When the tool 39 is engaged with the upper nozzle 3, the end 35 of the optical fiber and the camera 37 are arranged opposite and in the immediate vicinity of the marking 11.

The method for reading the marking 11 will be described briefly below.

The fuel assembly 1 is initially stored in a pool of the reactor. The tool 39 is moved, e.g., by the handling crane of the pool, and grips the upper nozzle 3 of the fuel assembly. Once the tool 39 is engaged, the computer 29 begins reading the marking. The computer 29 commands the light source 31 to emit optical radiation having a frequency suited for the reading. This optical radiation is transmitted by the optical fiber 33 to the marking. The nanoparticles 13, 15 are excited by the electromagnetic radiation, and re-emit optic radiation having different wavelengths. The radiation depends on the nature of the nanoparticle, the spatial arrangement of the nanoparticles, etc. This optical radiation is captured by the camera 27, and the signal is transmitted to the computer 29. The computer determines the identification number of the nuclear fuel assembly from that signal.

Advantageously, the computer 29 is programmed to evaluate the intensity of the optical radiation emitted by the nanoparticles and to determined, based on their intensity, information related to the dose of radioactivity received and/or emitted by the luminescent nanoparticles. This information may be given by a curve or table recorded in the memory of the computer. The curve or table may provided, e.g., the dose expressed in Gray, based on the intensity of the radiation. This curve or table is typically specific to each marking. It depends on the physical characteristics of the nanoparticles of the marking.

In one variant, the upper nozzle includes two markings on its external surface. The first marking 41 encodes information allowing for determination of the location of the second marking, and the wavelength of the optical radiation that is suited to excite the nanoparticles of the second marking 43. The first marking is always in the same place for all nuclear fuel assemblies. The first marking is provided to be read with optical excitement radiation having a known wavelength, identical for all nuclear fuel assemblies.

The second marking 43 is arranged in a place that varies from one fuel assembly to the next. It may be placed on one of the two nozzles, or on a maintenance grid of the nuclear fuel rods, or on a guide tube, or in any other place. Additionally, the second marking is provided to be read with optical excitement radiation having a wavelength that varies from one nuclear fuel assembly to the next.

This second marking encodes the identification number of the nuclear fuel assembly. Thus, in order to find out the identification number of thee assembly of FIG. 11, it is necessary first to read the first marking 41, and then to read the second marking 43. These two readings may be carried out with the same reading assembly, provided that the light source is suited to emit optical radiation with an adjustable wavelength. In one variant, it is possible to use two different reading assemblies, one to read the first marking 41 and the other to read the second marking 43.

What is claimed is:

1. A nuclear power station component comprising:
   a metal structure having an external surface;
   at least one marking placed on the external surface and encoding information related to the component, the at least one marking including a plurality of luminescent nanoparticles, each provided to emit optical radiation having a certain emission wavelength when the nanoparticle is excited with optical radiation having a certain emission wavelength, the at least one marking including:
   a first marking placed in a first predetermined place on the external surface, to be read with optical radiation having a first determined excitation wavelength; and
   a second marking placed in a second place on the external surface, to be read with optical radiation having a second determined excitation wavelength, the first marking encoding information related to the second place and the second excitation wavelength, the second marking encoding the information related to the component.

2. The component as recited in claim 1 wherein the nanoparticles are arranged in a linear pattern.

3. The component as recited in claim 1 wherein the nanoparticles are arranged in a pattern that extends over one plane.

4. The component as recited in claim 1 wherein the nanoparticles are arranged in a three-dimensional pattern.

5. The component as recited in claim 1 wherein each nanoparticle has a phosphor and a shell covering the phosphor, the shell consisting of a mineral oxide such as polysiloxane $SiO_2$, zirconium oxide $ZrO_2$, or alumina $Al_2O_3$.

6. The component as recited in claim 5 wherein the shell has a thickness suited to ensure the luminescence of the nanoparticle after at least three years under irradiation in the core of a nuclear power station.

7. The component as recited in claim 5 wherein that the phosphor consists of a mineral material.

8. A method for reading information related to the nuclear power station component as recited in claim 1, the method comprising:
   illuminating the first marking with the optical radiation having the first determined excitation wavelength suited to excite the luminescent nanoparticles of the first marking;
   acquiring a first optical radiation emitted by the luminescent nanoparticles of the first marking under the excitation effect resulting from the illumination;
   reconstituting, based on the first optical radiation acquired, a first piece of information indicating the second place on the external surface in which the second marking is located, and indicating the second excitation wavelength suited to read the second marking;
   illuminating the second marking with a second optical radiation having at least the second excitation wavelength;

acquiring a second optical radiation emitted by the luminescent nanoparticles of the second marking under the excitation effect resulting from the illumination; and reconstituting the information related to the nuclear power station component based on the second optical radiation acquired.

9. The method as recited in claim 8 wherein the illumination and acquisition steps are carried out under water.

10. The method as recited in claim 8 wherein the optical radiation used for illumination is transmitted to the component using a wave guide.

11. The method as recited in claim 10 wherein the wave guide is an optical fiber.

12. The method as recited in claim 8 wherein the optical radiation emitted by the nanoparticles is acquired using a camera or an optical fiber placed in the vicinity of the marking.

13. The method as recited in claim 8 further comprising:

evaluating a value representative of the intensity of the optical radiation emitted by the luminescent nanoparticles; and determining a dose of radioactivity emitted and/or received by the luminescent nanoparticles based on the value.

14. An assembly for reading the at least one marking of the nuclear power station component as recited in claim 1, the assembly comprising:

an illuminator for illuminating the first and second markings with the optical radiation having at least one wavelength suited to excite the luminescent nanoparticles;

a collector for collecting the optical radiation emitted by the luminescent nanoparticles of the first and second markings under the excitation effect resulting from the illumination; and a computer programmed to reconstitute the information related to the nuclear power station component based on the optical radiation acquired.

15. The assembly as recited in claim 14 wherein the nuclear power station component is a nuclear fuel assembly, the illuminator and the collector being mounted on a tool for gripping and transporting the nuclear fuel assembly.

* * * * *